(12) United States Patent
Beeson et al.

(10) Patent No.: US 7,801,127 B2
(45) Date of Patent: Sep. 21, 2010

(54) SYSTEM AND METHOD FOR CREATING A SEQUENCE NUMBER FIELD FOR STREAMING MEDIA IN A PACKET-BASED NETWORKS UTILIZING INTERNET PROTOCOL

(75) Inventors: Jesse D. Beeson, Franklin, MA (US); Peter S. Dawson, Canton, MA (US); Richard T. Holleran, Attleboro, MA (US); Marc A. C. Todd, Foxboro, MA (US); James T. Welch, Mashpee, MA (US)

(73) Assignee: IneoQuest Technologies, Inc., Mansfield, MA (US)

( * ) Notice: Subject to any disclaimer, the term of this patent is extended or adjusted under 35 U.S.C. 154(b) by 1177 days.

(21) Appl. No.: 11/257,184

(22) Filed: Oct. 24, 2005

(65) Prior Publication Data

US 2006/0088030 A1 Apr. 27, 2006

Related U.S. Application Data

(60) Provisional application No. 60/621,914, filed on Oct. 25, 2004.

(51) Int. Cl.
*H04L 12/28* (2006.01)
*H04L 12/56* (2006.01)

(52) U.S. Cl. .................................. 370/389; 370/394
(58) Field of Classification Search .............. 370/349, 370/389, 392, 394, 471, 474
See application file for complete search history.

(56) References Cited

U.S. PATENT DOCUMENTS

| 5,623,483 | A | 4/1997 | Agrawal et al. |
|---|---|---|---|
| 5,774,497 | A | 6/1998 | Block et al. |
| 5,883,924 | A | 3/1999 | Siu et al. |
| 6,011,868 | A | 1/2000 | van den Branden et al. |
| 6,151,359 | A | 11/2000 | Acer et al. |
| 6,259,677 | B1 | 7/2001 | Jain |

(Continued)

OTHER PUBLICATIONS

Ferrari, Domenico, Design and Applications of a Delay Jitter Control Scheme for Packet-Switching Internetworks, The Tenet Group, University of California and International Computer Science Institute, Berkeley, California, 12 pgs.

(Continued)

*Primary Examiner*—Chirag G Shah
*Assistant Examiner*—Ashley L Shivers
(74) *Attorney, Agent, or Firm*—Holland & Knight LLP; Brian J. Colandreo, Esq.; J. Mitchell Herbert, Jr., Esq.

(57) ABSTRACT

Streaming media network streams are modified using a sequence field with the IP layer 3 protocol compatible with already deployed IP switching systems except as noted for device and system testing and operational monitoring which can be used to detect the loss or out of order delivery of packets belonging to a stream. This approach can also provide the ability to numerically characterize the loss in terms of total loss, loss burst size, and loss frequency. By utilizing the bit locations of the IP-defined datagram Identification (ID) field and a unique numerical sequence, loss and out of order delivery may be tracked while avoiding the overhead and complexity associated with added upper layer protocols while gaining other key advantages such as in-situ marking of stream attributes.

24 Claims, 2 Drawing Sheets

U.S. PATENT DOCUMENTS

| | | | |
|---|---|---|---|
| 6,333,932 B1* | 12/2001 | Kobayasi et al. | 370/389 |
| 6,452,950 B1 | 9/2002 | Ohlsson et al. | |
| 6,700,893 B1 | 3/2004 | Radha et al. | |
| 6,711,164 B1* | 3/2004 | Le et al. | 370/392 |
| 6,717,917 B1 | 4/2004 | Weissberger et al. | |
| 6,725,274 B1* | 4/2004 | Slik | 709/231 |
| 6,728,209 B2 | 4/2004 | Pate et al. | |
| 6,738,813 B1 | 5/2004 | Reichman | |
| 6,741,569 B1 | 5/2004 | Clark | |
| 6,757,292 B2 | 6/2004 | Pate et al. | |
| 6,807,156 B1 | 10/2004 | Veres et al. | |
| 6,894,972 B1* | 5/2005 | Phaal | 370/229 |
| 6,928,055 B2 | 8/2005 | Ni | |
| 6,928,473 B1 | 8/2005 | Sundaram et al. | |
| 7,010,598 B2 | 3/2006 | Sitaraman et al. | |
| 7,142,518 B2 | 11/2006 | Mitchell | |
| 7,194,535 B2 | 3/2007 | Hannel et al. | |
| 7,227,843 B2* | 6/2007 | Belanger et al. | 370/237 |
| 7,382,768 B2 | 6/2008 | Doerr et al. | |
| 2002/0015387 A1 | 2/2002 | Houh | |
| 2002/0089926 A1* | 7/2002 | Kloth | 370/220 |
| 2002/0167911 A1 | 11/2002 | Hickey | |
| 2003/0033403 A1 | 2/2003 | Rhodes | |
| 2003/0126294 A1 | 7/2003 | Thorsteinson et al. | |
| 2003/0219007 A1 | 11/2003 | Barrack et al. | |
| 2004/0057446 A1 | 3/2004 | Varsa et al. | |
| 2004/0066753 A1 | 4/2004 | Grovenburg | |
| 2004/0071084 A1 | 4/2004 | El-Hennawey et al. | |
| 2004/0136327 A1 | 7/2004 | Sitaraman et al. | |
| 2008/0137653 A1* | 6/2008 | Jonsson | 370/389 |

OTHER PUBLICATIONS

DVStation-IP: MPEG Over IP Test and Monitoring, Pixelmetrix Corporation, 2 pgs.
Testing Digital Video, The International Engineering Consortium, 24 pgs.
Information Technology - Generic Coding of Moving Pictures and Associate Audio Information: Systems, International Standard, 2nd Edition, Dec. 1, 2000, 175 pages.
Application Note - AN106, Effects of Packet Interval Variation, Pixelmetrix Corporation, 3 pgs.
Chung, et al., Measurement of the Congestion Responsiveness of Realplayer Streaming Video Over UDP, Worcester Polytechnic Institute, 12 pgs.
Wang, et al., An Empirical Study of RealVideo Performance Across the Internet, 15 pgs.
Li, et al., MediaPlayer TM versus RealPlayer TM - A Comparison of Network Turbulence, 6 pgs.
Kuo, et al., Delivering Voice Over the Internet, Department of Computer Science and Information Engineering, Tamkang University, 5 pgs.
Dempsey, et al., An Empirical Study of Packet Voice Distribution Over a Campus-Wide Network, Computer Science Department, University of Virginia, IEEE, 1994, 10 pgs.
Kushida, et al., Framework of End-to-end Performance Measurement and Analysis System for Internet Applications, IEEE, 2001, pp. 674-679.
Mahanti, et al., Scalable On-Demand Media Streaming With Packet Loss Recovery, IEEE/ACM Transactions on Networking, vol. 11, No. 2, Apr. 2003, pp. 195-209.
Mena, et al., An Empirical Study of Real Audio Traffic, University of Southern California, 10 pgs.
Jeffay, et al., Beyond Audio and Video: Multimedia Networking Support for Distributed, Immersive Virtual Environments, IEEE, 2001, pp. 300-307.
Maxemchuk, et al., Measurement and Interpretation of Voice Traffic on the Internet, 8 pgs.
Kampichler, et al., Measuring Voice Readiness of Local Area Networks, IEEE, 2001, pp. 2501-2505.
Cole, et al., Voice Over IP Performance Monitoring, AT&T Laboratories, ACM SIGCOMM Computer Communication Review, pp. 9-24.
Van Der Merwe, et al., mmdump: A Tool for Monitoring Internet Multimedia Traffic, ACM SIDCOMM Computer Communication Review, pp. 48-59.
Loguinov, et al., Retransmission Schemes for Streaming Internet Multimedia: Evaluation Model and Performance Analysis, ACM SIDCOMM Computer Communications Review, vol. 32, No. 2, Apr. 2002, pp. 70-83.
Sinha, et al., Loss Concealment for Multi-Channel Streaming Audio, ACM, 2003, pp. 100-109.
Banerjea, et al., Experiments With the Tenet Real-Time Protocol Suite on the Sequoia 2000 Wide Area Network, ACM, 1994, pp. 183-191.
Loguinov, et al., Measurement Study of Low-bitrate Internet Video Streaming, ACM, 2001, pp. 281-293.
Markopoulou, et al., Assessing the Quality of Voice Communications Over Internet Backbones, IEEE/ACM Transactions on Networking, vol. 11, No. 5, Oct. 2003, pp. 747-760.
Almes, et al., A One-Way Delay Metric for IPPM, Sep. 1999, 18 pgs.
Almes, et al., A One-Way Packet Loss Metric for IPPM, Sep. 1999, 14 pgs.
Demichelis, et al., IP Packet Delay Variation Metric for IP Performance Metrics (IPPM), Nov. 2002, 19 pgs.
Chesire, et al., Measurement and Analysis of a Streaming-Media Workload, 12 pgs.
Matic, et al., Voice Traffic Performance Measurement in Packet Networks, ITI, Jun. 2002, pp. 499-504.
Feigin, et al., Measurement of Characteristics of Voice Over IP in a Wireless LAN Environment, Center for Wireless Information Network Studies, Worcester Polytechnic Institute, pp. 236-240.
Jitter Buffers, 1 pg.
Jitter and Delay Variation Data, 1 pg.
VoIP Score Calculation, 2 pgs.
Loguinov, et al., Measurement Study of Low-bitrate Internet Video Streaming, 13 pgs.
Schulzrinne, et al., RTP: A Transport Protocol for Real-Time Applications, The Internet Society, Jul. 2003, 89 pgs.
Schulzrinne, et al., RTP A Transport Protocol for Real-Time Applications, Jan. 1996, 75 pgs.
Demichelis, Instantaneous Packet Delay Variation Metric for IPPM, Jul. 1998, 15 pgs.
Friedman, et al., RTP Control Protocol Extended Reports (RTCP XR), Nov. 2003, 52 pgs.
A Proposed Time-Stamped Delay Factor (TS-DF) Algorithm for Measuring Networks Jitter on RTP Streams, EBU-TECH 3337, Geneva, Jan. 2010, 8 pgs.
The Industry's First IP Core Network Probe for Monitoring IP Networks that Provides True Wire Speed Performance at OC-48c, AU1500 IP Core Network Probe, Ando Corporation, 2001, 2 pgs.
TMS320AV7110, Integrated Digital Set-top Box Decoder Functional Specification, Texas Instruments, Jul. 6, 1998, 131 pgs.

* cited by examiner

SYSTEM AND METHOD FOR CREATING A SEQUENCE NUMBER FIELD FOR STREAMING MEDIA IN A PACKET-BASED NETWORKS UTILIZING INTERNET PROTOCOL

RELATED APPLICATION

This application claims the benefit of U.S. Provisional Application Ser. No. 60/621,914, filed on Oct. 25, 2004, entitled System and Method for Creating a Sequence Number Field for Streaming Media in Packet-Based Networks Utilizing Internet Protocol.

BACKGROUND

1. Technical Field

The present invention relates generally to the field of streaming. More specifically, the present invention is related to monitoring for streaming data loss in packetized form using the Internet Protocol (IP).

2. Background

Many electronic networks such as local area networks (LANs), metropolitan area networks (MANs), and wide area networks (WANs) are increasingly being used to transport streaming media whose real-time data transport requirements exhibit high sensitivity to data loss. While layer 4 protocols such as RTP and TCP incorporate sequence numbers for the detection of packet loss, many applications do not use these protocols due to the additional protocol overhead and resultant increased network utilization required or for other reasons. Nevertheless, unreliable layer 3 networks such as those using IP may lose packets under a variety of conditions such as transient oversubscription, electrical noise ingress, etc. The technical literature is replete with various schemes to implement Quality of Service (QOS) on such networks to address the requirements of streaming media, especially when intermixed with conventional, time and loss insensitive, best-effort delivery protocol stack data traffic. To verify the QOS intended effectiveness, systems must be tested. Tests and monitoring are used to verify the QOS design, implementation, and system configuration after deployment. Regardless of whether QOS-enabled or non-QOS-enabled networks are employed, it is necessary to verify the behavior of packet loss in the network while operating under test and during normal operating conditions. Verifying packet loss behavior requires a protocol field that changes (typically incrementing) with each successive packet such that a receiving device can determine if packets are received out of sequence, whether packets are missing, and the ability to numerically characterize the loss in terms of total loss, burst loss size, and loss frequency. The IP layer 3 protocol contains no such fields leaving this function for implementation in layer 4 protocols Alternatively, still higher layer protocols such as layer 7, the Application Layer, may include such a sequence field. An example for the streaming media application is the MPEG Transport Stream which, in addition to carrying encoder clock information and program specific information, also includes a Continuity Counter which can be used to detect packet loss. However, like the choice for including a layer 4 protocol, this requires additional encoder complexity and protocol overhead which may not be able to be tolerated in certain types of deployments.

Whatever the precise merits, features, and advantages of the above-mentioned prior art schemes, they fail to achieve or fulfill the purposes and/or the economies of the present invention.

SUMMARY

In one aspect of the present invention, a method is provided for instrumenting streams of packetized network traffic utilizing Internet Protocol (IP). The method includes receiving packetized data corresponding to the streams via a native streaming interface(s), replacing the IP ID field of the packetized data with instrumentation, and forwarding the instrumented packetized data to a native streaming interface(s).

In another aspect of the invention, a system is provided for generating packetized network traffic. This system includes a computing element configured to effect the foregoing method. This system also includes computer readable program code to configure the instrumentation for insertion into a received IP ID field.

In a further aspect of the invention, a method is provided for instrumenting streams of packetized network traffic utilizing Internet Protocol (IP). This method includes receiving packetized data in the form of layer 3 IP protocol compatible network traffic corresponding to the streams via a native streaming interface(s). A nonvolatile filter and compute engine that is loaded at time of manufacture, is used to replace the IP ID field of the packetized data with instrumentation, wherein the instrumentation includes sequence numbers. The instrumented packetized data is forwarded to a native streaming interface(s). The filter and compute engine may be dynamically reconfigured using a management system. This method may thus be effected without regard to any IP protocol layer greater than layer 3.

DESCRIPTION

Figure 1:
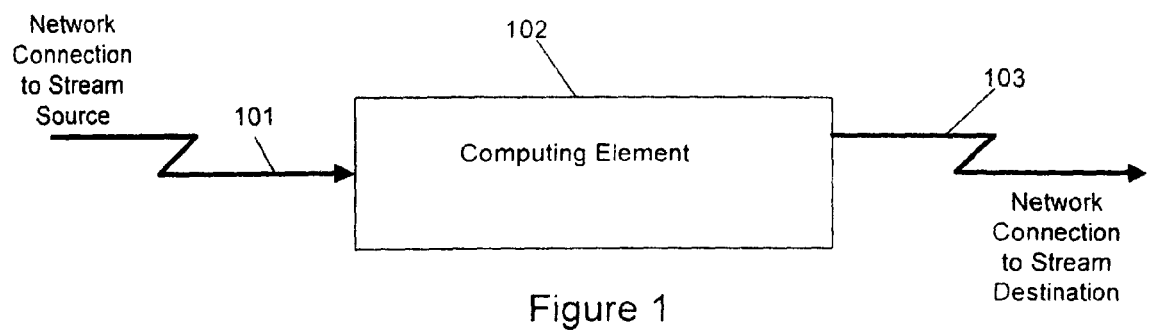
FIG. 1 illustrates a system according to the principles of the present invention for gaining access to a network flow of interest for the purpose of insertion of sequence numbers without modification of existing stream source equipment.

While this invention is illustrated and described in particular embodiments, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Many streaming media systems, such as VoD, broadcast television control centers, or satellite-based video distribution operations utilize packetized data networks for their data routing flexibility, low-cost, and omnipresence in modern data systems. Embodiments of the present invention produce a layer 3 IP compatible protocol with stream packet sequence numbers without the inherent overhead and complexity of conventional upper layer protocols and, furthermore, allows such sequence numbers to be added in-situ to existing streams lacking such sequence numbers without creating operating incompatibilities or equipment changes in the rest of the network except as noted. Adding sequence numbers makes possible identifying and troubleshooting missing and/or out of sequence packets that result from the limitations inherent in a layer 3 protocol.

In one embodiment, the system includes: (a) one or more native streaming interfaces to receive a copy of network traffic comprising one or more streams; (b) one or more compute engines to receive the stream and capable of generating and inserting the sequence numbers for the stream(s), and, (c) one or more native streaming interfaces to transmit packetized data corresponding to the modified stream(s), wherein the native streaming interface provides the means to permit transmission of the streams to the network and/or device in operation.

In another embodiment, the present invention provides for a system and method for generating and inserting the sequence numbers into packetized network traffic comprising one or more transportation streams wherein selected stream(s) for processing may be configured from a Control Workstation or from a Network-resident program source. The system includes: (a) one or more network interfaces to receive streaming network traffic associated with the transportation streams; (b) a compute engine capable of generating one or more sets of sequence numbers; (c) a workstation capable of configuring the Compute Engine; and (d) one or more network interfaces to transmit the streaming network traffic to the network and/or devices in operation.

Embodiments of the present invention thus provide a system and method for generating and using a sequence field with the IP layer 3 protocol with already deployed IP switching systems for device and system testing and monitoring which can be used to detect the loss or out of order delivery of packets belonging to a stream. It can also provide the ability to numerically characterize the loss in terms of total loss, loss burst size, and loss frequency. By utilizing the bit locations of the IP-defined datagram Identification (ID) field and a unique numerical sequence, loss and out of order delivery may be tracked while avoiding the overhead and complexity associated with added upper layer protocols while gaining other key advantages such as in-situ marking of stream attributes such as stream handling test equipment type and manufacture and marking location. The ID field in relation to other IP header fields is shown in the diagram below from the IP protocol specification.

Turning to FIG. 1, an embodiment of the present invention provides for an electronic embedded system including an embedded computing element 102 which taps existing network traffic at source and destination network connections 101 and 103, respectively. In a particular embodiment, the computing element has two ports and is inserted in series with an existing network link with either fiber, copper or wireless interfaces. Computing element 102 may be discrete, stand-alone device, or alternatively, may be incorporated (e.g., co-located) within a streaming source or processing device such as a switch or router, so that a separate device is not required to add the necessary sequence numbers, etc.

In desired embodiments, the particular sequence chosen is selected for simple and efficient computation in digital hardware and/or software. The particular chosen sequence can be used to indicate the type of device or type of stream associated with the chosen sequence. For example, the sequence type can be used to identify the type of and manufacturer of computing element 102 that implements the insertion of the stream sequence numbers. The stream sequence type can also be used to identify a particular stream of the many streams potentially passing through element 102. A receiver or detector of a stream so marked with a particular sequence can identify the marked stream by matching its sequence type with known assigned sequences without regard to its protocol address fields.

Thus, in these embodiments, the particular sequence of bits loaded into the layer 3 ID field may be used to indicate the type of information contained therein. Alternatively, or in addition, embodiments of the invention may use other fields, such as in upper layers (e.g., above IP layer 3) to supplement the information inserted into the layer 3 ID field. In this manner, upper layers may be used to help identify the marked stream, such as by indicating the particular type of information encoded into the layer 3 ID field. For example, an upper layer may be used to indicate the presence of a sequence count in the ID field, the type of sequence count, and/or manufacturer, etc. Thus, in the event all ID field bits are in use, such additional information may be conveyed by upper layers.

Figure 2:
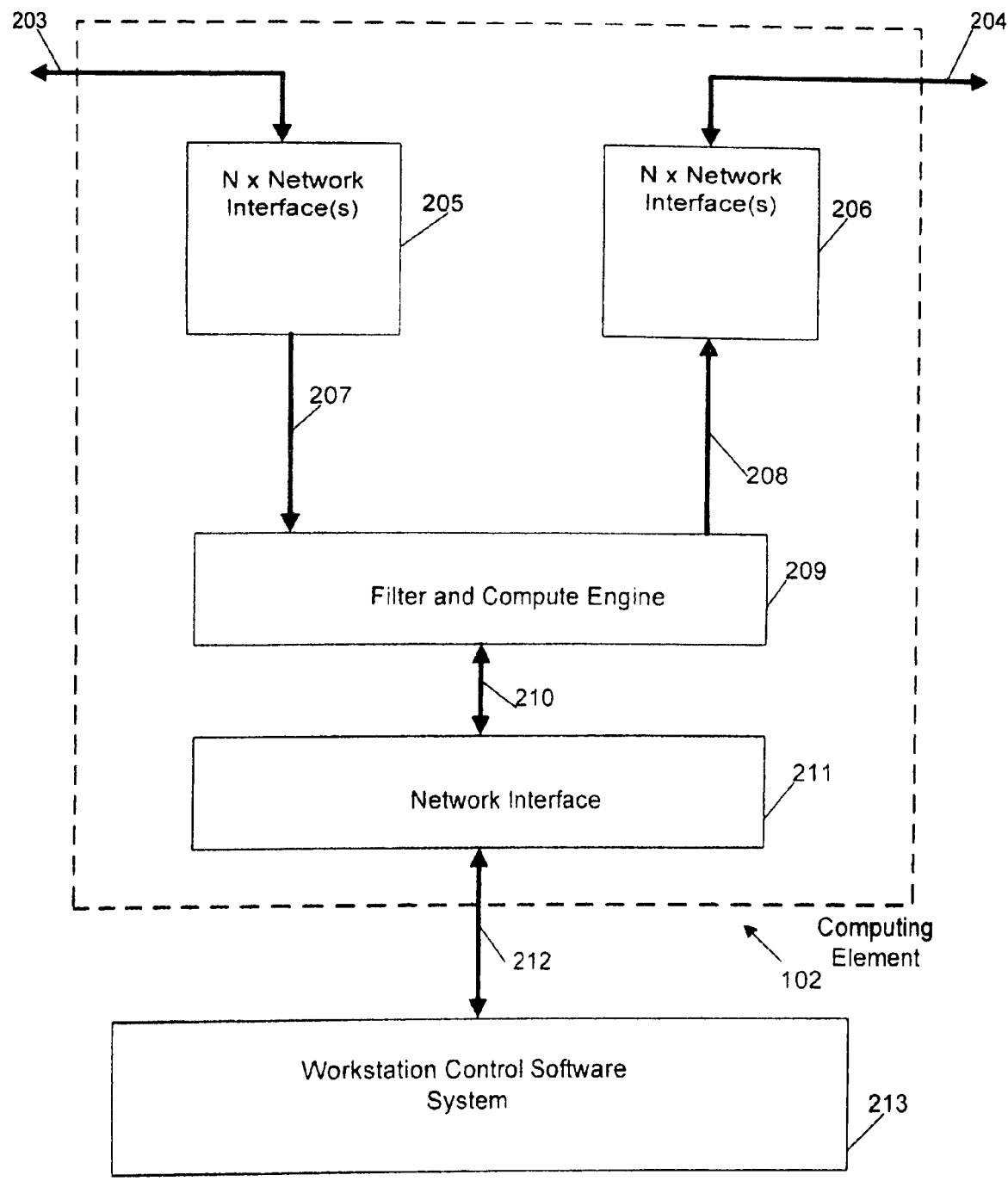
FIG. 2 illustrates an internal block diagram of the computing element of FIG. 1 and associated controller and control interface used to transmit control instructions to the computing element.

FIG. 2 illustrates the interconnection of the major components of an exemplary embodiment of the subject invention.

```
                    Example Internet Datagram Header
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|     Fragment Offset     |
+-+-+-+-+-+-+-+-+-+-+-+-+-+-+-+-+-+-+-+-+-+-+-+-+-+-+-+-+-+-+-+-+
| Time to Live |    Protocol    |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

The ID field, per the IP specification, may be used to distinguish the fragments of one datagram from those of another. However, many networks, especially those deployed for streaming media such as voice and video, do not employ fragmentation making the field available for other uses in these networks.

As shown, computing element 102 operates on a streaming media's packet components received from a native Network Interface 203, processes the streaming flow, and transmits the modified flow using a native network interface 204. The filter and compute engine 209, may receive the streaming media's packets using the network interface(s) 205 and interface 207 and convey the results of the processing operations via interface 208 to the computing element's network interface(s) 206 for delivery of the modified streaming media output to the device or system under test via a native network interface 204.

A streaming media flow may be transmitted on a packetized network by segmenting the data flow into fixed or variable size packets which are each addressed to a common destination and identified with a common source address. Due to common protocol layering (OSI 7-Layer Model) and design techniques, such packets typically have layer 2 and layer 3 protocol addresses, layer 4 protocol port number, VLAN ID, etc. A streaming media flow thus may be identified by the n-tuple of its layer 2 and 3 address, layer 4 port number, VLAN ID, etc. (In this regard, the skilled artisan will recognize that any of various combinations of these or other parameters may be used to identify the streaming media flow.) The filter and compute engine 209 may modify one or more flows by operating on a flow's packets by creating and inserting a particular sequence number in a flow's successive packets in the layer 3 IP ID field. The modified flow is then forwarded via interface 208 to the native network interface 206 providing the modified flow to the device and/or system under test or in operational status.

The network interfaces 205 and 206 used for receiving and transmitting the streaming media may include any type network link protocol that supports packet-based transmission including, but not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, or ZIGBEE.

With the addition of a workstation and workstation control software 213 connected to a native packet based network/interface 212, dynamic changes and configuration of the computing element 102 may be effected. Changes to computing element 102 include configuring the number of streams and selection of particular streams to which a sequence number being produced by compute engine 209 is inserted. Other changes include the type of sequence to be used per stream.

It should be noted that more than one network interface can be used to receive and transmit network traffic. For example, FIG. 2 illustrates computing element 102 with up to N network interfaces 205 and 206, with streams fed to/from Compute Engine 209 via interfaces 207 and 208. The network interfaces 205 and 206 connect to the network and/or device under test via native network connections 203 and 204. Network link protocols that support such packet-based transmission include, but are not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, or ZIGBEE.

The filter and compute engine 209 may be configured via interface 210, network interface 211, native network/interface 212, and workstation control software 213 such that it can modify and configure the number of streams and selection of particular streams to which a sequence number being produced by compute engine 209 is inserted. Other changes include the type of sequence to be used per stream.

The particular sequence chosen for stream insertion should be chosen for computing economy. In particular, one such sequence is the bit inverse of the unencoded incrementing (counting) sequence if the least significant bit (lsb) is a 1. This results in the signed math sequence of: 0, −1, 2, −3, 4, −5, . . . . Since the IP ID field is 16 bits in this representative embodiment, the sequence number may be chosen to be 16 bits long. Alternatively, the sequence number may be less than 16 bits, leaving the remaining bits for other uses, such as identifying the stream or manufacturer.

It should be noted that network interface 211, native network/interface 212, and workstation (management system) 213 may be physically co-located with the compute engine 209 and need not be external.

It should be noted that a pure hardware, a pure software, and a hybrid hardware/software implementation of the compute engine components is envisioned. Moreover, although embodiments of the present invention have been shown and described as stand-alone modules connectable to a data stream, they may also be co-located with nominally any network component. For example, embodiments may include hardware, software, and/or hybrid hardware/software components disposed within otherwise conventional network devices or nodes, such as IP switches, routers, servers, VoD servers, VoIP servers, PCs, blades, DSLAMs (Digital Subscriber Line Access Multiplexer), Set Top Boxes (e.g., for CATV), IP Phones, Firewalls, etc., and combinations thereof.

Also, various kinds of interfaces can be used for establishing a packet-based communication session between the workstation system 213 and the computing element, such as (but not limited to) a gigabit Ethernet network or a 10/100 Mbit/s Ethernet network interface card. Moreover, one skilled in the art can envision using various current and future interfaces and, hence, the type of packetized network interface used should not be used to limit the scope for the present invention.

The present invention allows the implementer the ability to insert a sequence number in an existing stream or streams on an IP network. Additionally, the present invention provides the ability to scale with improvements in network conduit technology. For example, the faster the network conduit, the more streams that can be modified.

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Particular embodiments of such computer program code based products include: (a) receiving network traffic comprising one or more IP flows; (b) generating new sequence numbers for the flows; (c) forwarding the newly constituted flows to a data consumer.

A system and method has been shown in the above embodiments for the effective implementation of a system and method for generating sequence numbers for a layer 3 IP compatible protocol with stream packet sequence numbers without the inherent overhead and complexity of conventional upper layer protocols and, furthermore, allows such sequence numbers to be added in-situ to existing streams lacking such sequence numbers without creating operating incompatibilities or equipment changes in the rest of the network except as noted. Adding sequence numbers makes possible identifying and troubleshooting missing and/or out of sequence packets that result from the limitations inherent in a layer 3 protocol. The particular chosen sequence can be used to indicate the type of device or type of stream associated with the chosen sequence. For example, the sequence type can be used to identify the type of and manufacturer of the Computing Element equipment shown in FIG. 1 that implements the insertion of the stream sequence numbers. The stream sequence type can also be used to identify a particular stream.

While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by number of network interfaces, number of streams, type of packetized network conduit, location of control software, choice of hardware or software implementation of compute engine, type of streaming media data, computing environment, or specific hardware associated with the network interfaces or compute engine system.

In addition, while embodiments have been shown and described in which the layer 3 ID field of packetized data flow is replaced with sequence information, etc., those skilled in the art should recognize that packetized data flows may be originated with such information without departing from the spirit and scope of the present invention. In other words, the information discussed herein (sequence, etc.) may be inserted into the data flows at any time (i.e., at origination thereof, or afterwards), while remaining within the scope of the present invention. For example, devices such as streaming test generators, VoD servers, mpeg or other stream compression encoders, or stream multiplexers, etc., may be used to generate streams having such information disposed within their layer 3 ID fields. The above systems may be implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (i.e., CRT) and/or hardcopy (i.e., printed) formats. The programming of the present invention may be implemented by one skilled in the art of computer systems and/or software design.

The invention claimed is:

1. A computer implemented method for instrumenting streams of packetized network traffic utilizing Internet Protocol (IP), comprising:
   receiving packetized data corresponding to the streams via a streaming interface(s);
   dynamically configuring, by a computing element, instrumentation for insertion into an IP ID field of the packetized data;
   inserting, by the computing element, the instrumentation into the IP ID field of the packetized data, including replacing an initial stream's received IP ID field information with a 16 bit long number consisting of the bit inverse of an unencoded incrementing sequence if the least significant bit (lsb) is a 1; and
   forwarding the instrumented packetized data to a streaming interface(s).

2. The computer implemented method of claim 1, wherein said instrumentation comprises sequence numbers.

3. The computer implemented method of claim 1, wherein the streams comprise layer 3 IP protocol compatible network traffic.

4. The computer implemented method of claim 1, being effected independently of any IP protocol layer greater than layer 3.

5. The computer implemented method of claim 4, wherein an IP protocol layer greater than layer 3 is used to supplement said instrumentation.

6. The computer implemented method of claim 1, comprising effecting said inserting with a nonvolatile filter and compute engine included within the computing element that is loaded at time of manufacture.

7. The computer implemented method of claim 1, wherein said inserting comprises originating an initial stream with said instrumentation prior to said receiving.

8. The computer implemented method of claim 1, further comprising detecting the loss or out of order delivery of the instrumented packetized data.

9. The computer implemented method of claim 8, further comprising numerically characterizing the loss in terms selected from the group consisting of total loss, loss burst size, and loss frequency.

10. The computer implemented method of claim 1, wherein said inserting comprises in-situ marking of stream attributes.

11. The computer implemented method of claim 10, wherein the stream attributes are selected from the group consisting of identification of stream handling test equipment type, manufacture, and marking location.

12. A computing system for generating packetized network traffic, wherein the computing system includes computer readable program code residing on a non-transitory computer storage medium having a plurality of instructions stored thereon that, when executed by a processor, cause the computing system to perform operations comprising:
   receiving packetized data corresponding to streams of packetized network traffic utilizing Internet Protocol (IP) via a streaming interface(s);
   dynamically configuring, by a computing element, instrumentation for insertion into an IP ID field of the packetized data, including configuring a sequence number type where at least one type is a 16 bit long number consisting of the bit inverse of an unencoded incrementing sequence if the least significant bit (lsb) is a 1;
   selecting a particular stream or group of streams for said instrumentation;
   inserting, by the computing element, the instrumentation into the IP ID field of the packetized data; and
   forwarding the instrumented packetized data to a streaming interface(s).

13. The computing system of claim 12, comprising a workstation communicably coupled to said computing element, said workstation configured to control operation of said computing element.

14. The computing system of claim 12, comprising computer readable program code configured to determine a type of instrumentation.

15. The computing system of claim 12, wherein said instrumentation comprises sequence numbers.

16. The computing system of claim 12, comprising computer readable program code configured to select individual ones of the streams for instrumentation.

17. The computing system of claim 12, wherein the computing element includes a compute engine that is nonvolatile and loaded at time of manufacture.

18. The computing system of claim 12, being configured to operate without regard to any IP protocol layer greater than layer 3.

19. The computing system of claim 12, wherein said computing element is configured for in-situ marking of stream attributes.

20. The computing system of claim 19, wherein the stream attributes are selected from the group consisting of identification of stream handling test equipment type, manufacture, and marking location.

21. A computing system for generating packetized network traffic, including a computing element configured to perform operations comprising:
- receiving packetized data corresponding to streams of the packetized network traffic utilizing Internet Protocol (IP) via a streaming interface(s);
- dynamically configuring, by the computing element, instrumentation for insertion into an IP ID field of the packetized data;
- inserting, by the computing element, the instrumentation into the IP ID field of the packetized data, including replacing an initial streams received IP ID field information with a 16 bit long number consisting of the bit inverse of an unencoded incrementing sequence if the least significant bit (lsb) is a 1; and
- forwarding the instrumented packetized data to a streaming interface(s); wherein the computing element is disposed within a network device selected from the group consisting of: switches, routers, servers, VoD Servers, PCs, blades, DSLAMs (Digital Subscriber Line Access Multiplexer), Set Top Boxes, IP Phones, Firewalls, streaming test generators, mpeg or other stream compression encoders, stream multiplexers, and combinations thereof.

22. A method for instrumenting streams of packetized network traffic utilizing Internet Protocol (IP), comprising:
- receiving packetized data in the form of layer 3 IP protocol compatible network traffic corresponding to the streams via a streaming interface(s);
- dynamically configuring, by a nonvolatile filter and compute engine that is loaded at the time of manufacture, instrumentation for insertion into an IP ID field of the packetized data;
- inserting, with the nonvolatile filter and compute engine, the instrumentation into the IF ID field of the packetized data, wherein the instrumentation comprises sequence numbers: including replacing an initial streams received IP ID field information with a 16 bit long number consisting of the bit inverse of an unencoded incrementing sequence if the least significant bit (lsb) is a 1; and
- forwarding the instrumented packetized data to a streaming interface(s).

23. A method for instrumenting streams of packetized network traffic utilizing Internet Protocol (IP), comprising:
- receiving packetized data corresponding to the streams via a streaming interface(s);
- inserting, by a computing element, instrumentation into the IF ID field of the packetized data, wherein the inserting includes replacing an initial streams received IP ID field information with a 16 bit long number consisting of the bit inverse of the unencoded incrementing sequence if the least significant bit (lsb) is a 1; and
- forwarding the instrumented packetized data to a streaming interface(s).

24. A computing element for generating packetized network traffic, wherein the computing element includes computer readable program code residing on a non-transitory computer storage medium having a plurality of instructions stored thereon that, when executed by a processor, cause the computing element to perform operations comprising:
- receiving packetized data corresponding to the streams via a streaming interface(s);
- configuring instrumentation for insertion into a received IP ID field, wherein configuring the instrumentation includes configuring a sequence number type where at least one type is a 16 bit long number consisting of the bit inverse of the unencoded incrementing sequence if the least significant bit (lsb) is a 1;
- selecting a particular stream or group of streams for the instrumentation;
- inserting the instrumentation into the IP ID field of the packetized data; and
- forwarding the instrumented packetized data to a streaming interface(s).

* * * * *